United States Patent [19]

Leonard, Jr.

[11] Patent Number: 5,197,379
[45] Date of Patent: Mar. 30, 1993

[54] OUTDOOR COOKER

[76] Inventor: Gustav Leonard, Jr., 4208 Braeburn Dr., Fairfax, Va. 22032

[21] Appl. No.: 817,717

[22] Filed: Jan. 7, 1992

[51] Int. Cl.$^5$ .................................................. A47J 37/07
[52] U.S. Cl. ..................................... 99/446; 126/25 R
[58] Field of Search .................. 99/419, 421 H, 444, 99/446, 450, 482, 339, 340; 126/9 R, 25 R, 9 B, 41 R

[56] References Cited

U.S. PATENT DOCUMENTS

| | | | |
|---|---|---|---|
| 693,725 | 2/1902 | Leland | 99/446 |
| 739,214 | 9/1903 | Phillips | 99/446 |
| 760,430 | 5/1904 | Daniel | 126/41 |
| 1,051,503 | 1/1913 | Klein | 126/41 |
| 2,323,821 | 7/1943 | Lindemann | 126/41 |
| 2,763,200 | 9/1956 | Kittler | 99/421 H |
| 2,894,448 | 7/1959 | Henderson | 99/444 |
| 3,322,060 | 5/1967 | Gilbert | 99/450 |
| 3,455,233 | 7/1969 | Cable | 99/446 |
| 3,568,590 | 3/1971 | Grice | 99/450 |
| 3,742,839 | 7/1973 | Maley | 126/25 |
| 3,978,782 | 9/1976 | Werling | 99/446 |
| 4,108,055 | 8/1978 | Simmons | 99/421 H |
| 4,335,705 | 6/1982 | Kurotaki | 126/41 R |
| 4,418,678 | 12/1983 | Erickson | . |
| 4,598,693 | 7/1986 | Koziol | 99/341 |
| 4,773,319 | 9/1988 | Holland | . |
| 4,800,865 | 1/1989 | Setzer | . |
| 4,882,985 | 11/1989 | Beller | 99/450 |
| 5,007,403 | 4/1991 | Chen | 126/25 AA |

FOREIGN PATENT DOCUMENTS 0266325 11/1987 Japan ........................... 126/41 R
99651 8/1940 Sweden .......................... 126/41

Primary Examiner—Philip R. Coe
Assistant Examiner—Randall Edward Chin
Attorney, Agent, or Firm—Lowe, Price, LeBlanc & Becker

[57] ABSTRACT

An outdoor cooker comprises a housing having walls defining a cavity, a lower portion of the housing for receiving fuel, an upper portion retaining a grill for supporting food and a deflector in the cavity interposed between the fuel and grill. Corresponding walls of the housing and outer surfaces of the deflector are arcuate, spaced apart and in conformance with each other to maintain laminar flow of heat between the fuel and grill.

18 Claims, 3 Drawing Sheets

OUTDOOR COOKER

BACKGROUND OF THE INVENTION

The present invention pertains generally to an outdoor cooker similar to a barbecue grill, and more particularly to an outdoor cooker that cooks by indirect heating.

Recent research has demonstrated that certain methods of cooking foods such as beef, pork, poultry and fish can create chemicals which do not naturally occur in the food. While food is grilling, fat and juices drip and contact open flames, coals or heating elements, and are incinerated producing products such as smoke and gas. It has been found that these products contain polycyclic aromatic hydrocarbons (PAHs), known carcinogens. During the cooking process, these products blow pass the food depositing PAHs on the surface of the food being cooked.

It has also been found that another group of chemicals, called heterocyclic aromatic amines (HAAs), also develop during grilling, broiling or frying of meats. HAAs, also known carcinogens, are formed when meats are cooked at high temperatures. When meats are cooked at lower temperatures, negligible amounts of the chemicals are formed.

Standard grill designs have the disadvantage of producing smoke and gas resulting from the incineration of fat and meat juices which drip and contact an open flame or element. Other disadvantages are that prior art grills do not always cook food evenly, burn fuel efficiently or preclude the incineration of food drippings.

For example, U.S. Pat. No. 4,773,319 describes a barbecue grill which eliminates flaming during cooking. A deflector plate is positioned directly above a gas burner and a grease collector, having two downwardly sloping surfaces and an inclined channel, is located above the deflector plate. The deflector directs heat generally upwardly through a space between the walls of the housing of the barbecue grill and the sides of the grease collector. However, the heat flow is turbulent which can result in hot spots.

In addition, while the above described barbecue grill cooks with indirect heat and prevents food drippings from contacting open flames, the grease (or drippings) collector is in extreme proximity to the gas burner. Since the grease collector consists of a single thickness of stainless steel sheet metal, it is most likely that the drippings will incinerate on the collector.

SUMMARY OF THE INVENTION

Accordingly, an object of the present invention is to cook foods within a cooker using indirect heat and at lower but sufficient cooking temperatures while providing even heat distribution.

Another object of the invention is to prevent food juices and fat from contacting and being incinerated by an open flame in a cooker.

Still another object is to prevent food juices and fat drippings collected on a drip collector from being incinerated during the cooking process.

Still another object is to provide laminar heat flow in a cooker to prevent hot spots from occurring in the vicinity of food while providing even heat distribution.

To achieve these and other objects, an outdoor cooker in accordance with one aspect of the invention comprises a cooker housing having outer walls defining a cavity, a lower portion of the housing receiving fuel, an upper portion retaining a grill for supporting food, and a deflector positioned in the cavity between the fuel and the grill. Corresponding walls of the cooker housing and surfaces of the deflector are arcuate and in conformance with each other to establish a laminar flow of heat between the fuel and grill.

In accordance with another aspect of the invention the cooker housing includes a fat and meat juice collecting tray positioned over the deflector. A removable hood for the housing contains an inspection opening for enabling food being cooked to be observed.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
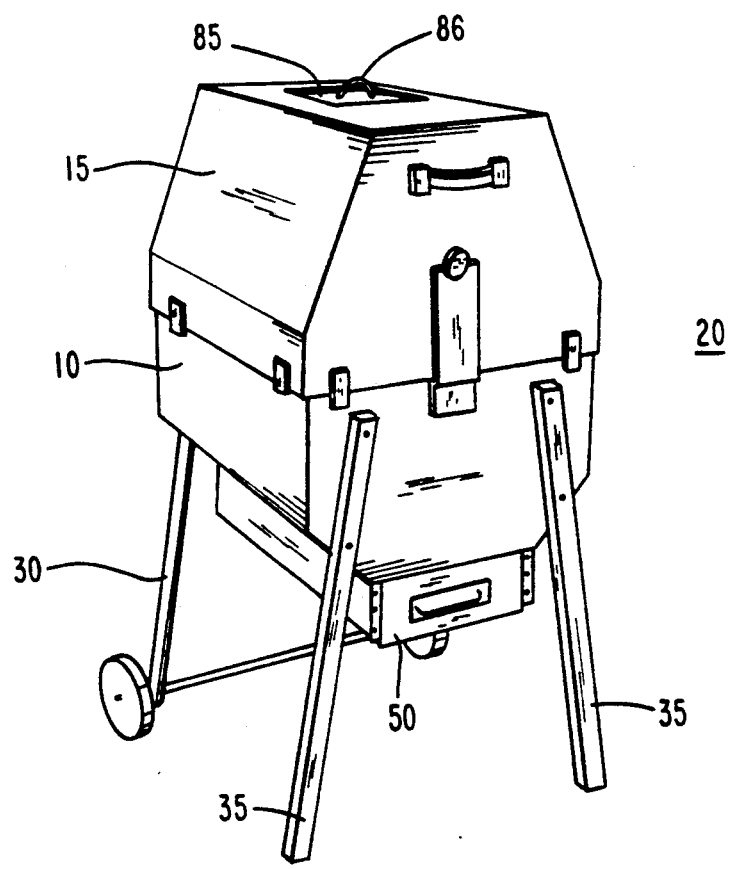
FIG. 1 is a perspective view of the outdoor cooker of the present invention.
Figure 2:
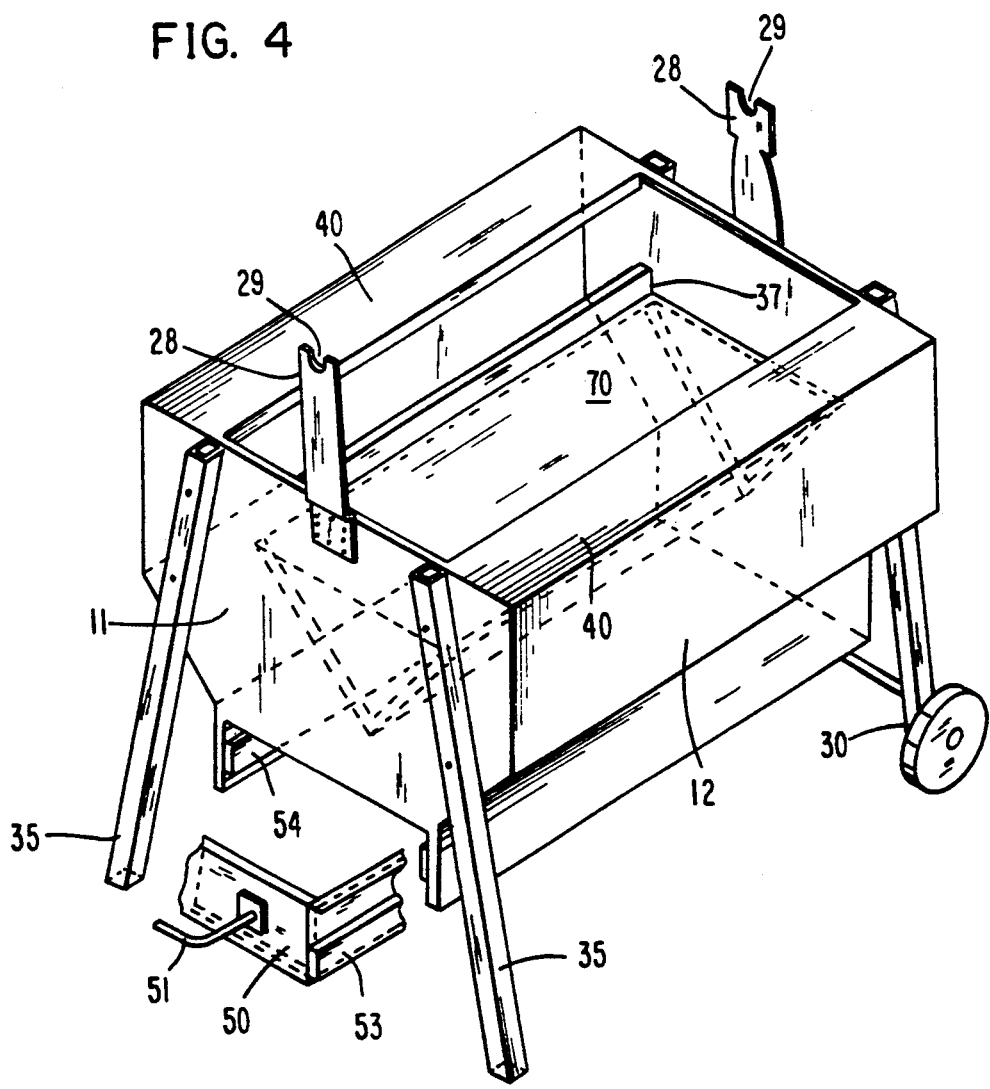
FIG. 2 is a more detailed perspective view of the exterior of the cooking housing of the invention with hood removed.
Figure 3:
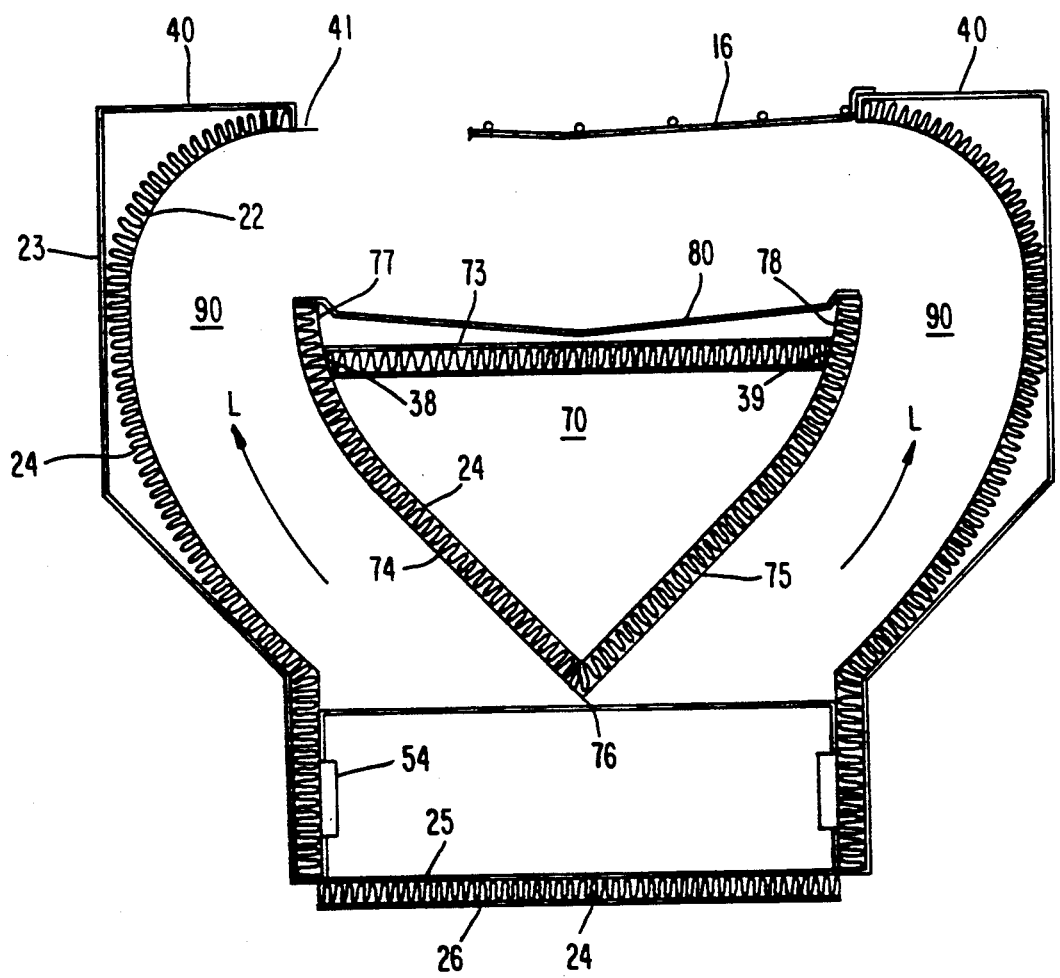
FIG. 3 is a cross-sectional view of the interior of the cooking housing taken along the line 3—3 in FIG. 2.

Referring to FIGS. 1-3, the outdoor cooker of the present invention, designated generally by the numeral 20, comprises a housing 10 on wheeled support legs 30 and stationary support legs 35, and a removable hood 15. Housing 10, preferably formed of metal, has an upper surface 40 with an opening 41 (FIG. 2) in which a cooking grid 16 is positioned, end walls 11 and side walls 12. End walls 11 and side walls 12 of the housing 10 are doubled walled and each comprises inner and outer layers 22 and 23 establishing an insulating dead air space 24 between them. Air is preferred as insulation in the space 24 within walls 11 and 12 to prevent possible contamination of food by leakage of insulating material into the cooker. However, an insulating material such as non-toxic vermiculite, acceptable forms of fiberglass or the like, can be used.

A fuel tray 50, positioned at the bottom of housing 10, conforms to the shape of the housing and is fitted with a handle 51. The bottom of fuel tray 50 is also doubled walled and each comprises layers 25 and 26 defining an air space 24 for insulation. Slides 53, attached to opposite sides of fuel tray 50, ride upon rails 54 attached to inner walls 22 of the inner surface at the bottom of cooking housing 10 for removability of the tray. Charcoal and charcoal briquettes are placed in fuel tray 50 as fuel to generate cooking heat. Of course, any suitable fuel can be used. Alternatively, the bottom of cooking housing 10 can be adapted to receive a gas burner or ar electric element to achieve the same result.

The interior of cooking housing 10 contains a deflector 70 having an upper member 73 and two side members 74 and 75 attached to the inner surfaces of end walls 11, generally as shown at 37 in FIG. 2. The upper and side members 73-75 are double walled to define a dead air space 24 for insulating purposes. Upper member 73 is positioned directly beneath and parallel to opening 41 in upper surface 40 of housing 10. Members 74 and 75 join at an apex 76 immediately above fuel tray 50 and are attached to opposite ends of upper member 73 at positions 38 and 39, with portions 77, 78 extending above the upper member. Thus, upper member 73 defines a surface that is recessed as shown in FIG. 3. Extending portions 77 and 78 of side members 74 and 75 in effect form flanges upon which ends of a removable drip tray 80 can rest when the tray is positioned above upper member 73.

Side members 74 and 75 are also formed to establish curved surfaces from apex 76 just above fuel tray 50 to the ends of portions 77 and 78. Curved side members 74 and 75 throughout are positioned at equal distances from the inner surface 22 of the corresponding side wall 12 of housing 10 as shown. Thus, each curved side surface 74 and 75, together with the corresponding curved inner surface 22 of the corresponding side wall 12, forms an arcuate duct 90. The gentle curve of the duct establishes laminar flow of heat L between fuel tray 50 and cooking grid 16. Laminar flow provides improved heat distribution and prevents hot spots which tend to occur when heat flow is turbulent. This improved heat distribution results in more even cooking.

Removable V-shaped drip tray 80 rests on the top edges of deflector portions 77 and 78 and is positioned directly beneath food on cooking grid 16. No portion of V-shaped drip tray 80 contacts upper member 73 when resting on deflector portions 77 and 78. So positioned, any juices or fat dripping from the food will be collected and prevented from contacting the burning fuel and being incinerated. Separating surface 71 from upper member 73 and insulating upper and side members 73-75 of deflector 70 aids in reducing the temperature on surface 71 below the flash point of the juices and fat drippings. As a result, the collected juices and fat drippings are not incinerated during the cooking process.

Deflector 70 shields both cooking grid 16 and drip tray 80 from direct exposure to the heat source and helps provide laminar heat flow from the source of heat to the food. Food on cooking grid 16, shielded from directed exposure to the heat source by the interposed insulated deflector, cooks at lower temperatures than is possible when food is directly exposed to the heat source in traditional grill designs. Test results have shown cooking temperature inside the cooker around the cooking grid, using charcoal briquettes, not exceeding 420° F. and sustaining a temperature of at least 325° F. for approximately four hours.

Figure 4:
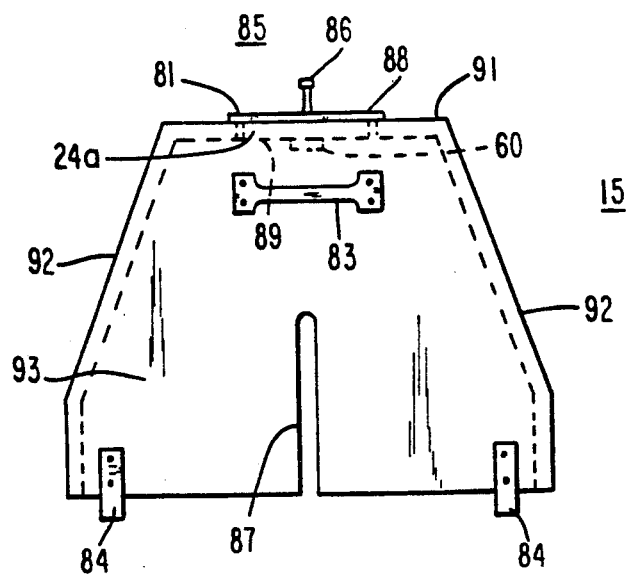
FIG. 4 is an end view of the removable hood.

Removable hood 15, shown in FIG. 4, comprises a top 91, sides 92 and ends 93, and is similarly double walled to establish a dead air space for insulation. Handles 83 are on opposite ends 93, and stops 84 are provided for easy and accurate placement of hood 15 on housing 10. On each end surface 93 of hood 15 are slots 87 which align with spit supports 28 (FIG. 2) attached to, and extending above, opposite ends of housing 10. Spit supports 28 receive a spit at the top ends 29 positioned above cooking housing 10 at a distance which allows free rotation of a spit when a large food item, such as a turkey, is placed on it. Slots 87 in hood 15 permit the ends of a spit to extend beyond hood 15. This arrangement permits the placement of hood 15 on cooking housing 10 when a spit is used and also enables gases to be vented outside the cooker.

An inspection opening 88 is provided on top surface 91 of hood 15, permitting inspection of the cooking progress without removing the entire hood. A removable inspection cover 85, including top surface 81 and lower surface 89 establishing a dead air space 24a between them, covers the opening 88. Handle 86 is attached to top surface 81 allowing easy removal of inspection cover 85. Lower surface 89 of inspection cover 85 can be fitted with a cooking thermometer 60 to permit monitoring of cooking temperature. With removable hood 15 positioned on cooking housing 10, outdoor cooker 20 will easily retain heat and burn charcoal briquettes in fuel tray 50 more efficiently than will an uninsulated conventional charcoal grill. In addition, substantial loss of heat is avoided when the user inspects the cooking progress by viewing through inspection cover 85 rather than by removing the hood 15.

With the hood 15 applied, the outdoor cooker can be converted to a steaming unit by removing drip tray 80 and placing a pan of water on top surface 73. The temperature attained by the outdoor cooker is sufficient to convert the water to steam.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims that follow.

What is claimed:

1. A cooker, comprising:
   insulated end walls and side walls having inner surfaces partially defining a cavity;
   an insulated tray for holding a burning fuel to generate cooking heat, supported in a lower portion of the cavity of said cooker;
   a grill for supporting food, supported at an opening formed in an upper portion of the cavity of said cooker above said insulated tray; and
   a closed insulated deflector positioned within said cavity and interposed between said insulated tray and said grill, said insulated deflector having an insulated top surface with opposing ends and two insulated side surfaces fixedly attached between and to said insulated end walls to form a closed air space, said insulated top surface positioned a predetermined distance directly beneath and parallel to said opening, and each insulated side surface being attached to said opposing ends of said insulated top surface, joined at an apex immediately above said insulated tray, sized to extend above said insulated top surface a predetermined distance forming flanges, and including an inner surface facing a corresponding inner surface of said insulated side walls; wherein
   the inner surfaces of said two insulated side surfaces of said deflector and corresponding facing inner surfaces of said insulated side walls of said cooker are arcuate, spaced apart and in conformance with each other to enable a laminar flow of said cooking heat between said fuel tray and said grill.

2. The cooker of claim 1, further comprising a removable drip pan set on said flanges and positioned above said insulated top surface.

3. The cooker of claim 1, further comprising an insulated removable hood.

4. The cooker of claim 3, wherein all the surfaces of said insulated deflector, the insulated end walls and side walls, the insulated tray, and the insulated removable hood are double-walled.

5. The cooker of claim 3, wherein the insulated removable hood is adapted to accommodate a spit positioned a predetermined distance above said upper portion of said cooker.

6. The cooker of claim 3, wherein
said insulated removable hook includes an upper surface with an inspection opening, and
an insulated removable cover is adapted to be positioned to enclose said inspection opening.

7. The cooker of claim 3, further comprising a spit retaining mechanism affixed to said insulated end walls.

8. The cooker of claim 7, wherein said insulated removable hood includes two end walls, each having a slot to receive exposed portions of a spit and to provide venting.

9. An outdoor cooker, comprising:
a housing including insulated end walls and side walls having inner surfaces partially defining a cavity;
an insulated tray for holding a burning fuel to generate cooking heat, supported in a lower portion of said cavity of said cooker;
a grill for supporting food, supported at an opening formed in an upper portion of said cavity of said cooker above said insulated tray;
an insulated hood overlying said grill;
a closed insulated deflector positioned within said cavity and interposed between said insulated tray and said grill, said insulated deflector having an insulated upper member with opposing ends and two insulated sidewall members fixedly attached between and to said insulated end walls to form a closed air space, said insulated upper member being spaced apart and parallel to said grill, and each insulated sidewall member extending downwardly from one of said opposing ends, facing a corresponding inner surface of said insulated side walls, joining at an apex a predetermined distance above said insulated tray, and sized to extend above said opposing ends of said insulated upper member a predetermined distance forming flanges; and
a removable drip pan set on said flanges and positioned above said insulated upper member; wherein
the insulated sidewall members and corresponding facing inner surfaces of said insulated side walls of said housing are spaced apart and continuous along an entire distance from said insulated upper member to said apex to enable a laminar flow of heat between said burning fuel and said cooking grill.

10. The outdoor cooker of claim 9, wherein an inspection opening is formed in said insulated hood, and a removable inspection cover encloses said inspection opening.

11. The outdoor cooker of claim 10, wherein said insulated tray is slidable.

12. The outdoor cooker of claim 10, wherein said removable inspection cover includes a temperature sensor.

13. The cooker of claim 9, wherein all the surfaces of said closed insulated deflector, the insulated end walls and side walls, insulated tray, and insulated hood are double-walled.

14. The cooker of claim 9, wherein the insulated hood is adapted to accommodate a spit positioned a predetermined distance above said upper portion of said cooker.

15. The cooker of claim 14, wherein
said insulated hood includes an upper surface with an inspection opening, and
an insulated removable cover is adapted to be positioned to enclose said inspection opening.

16. The cooker of claim 14, further comprising a spit retaining mechanism affixed to the insulated end walls of said housing.

17. The cooker of claim 16, wherein said insulated hood includes two end walls, each having a slot to receive exposed portions of a spit and to provide venting.

18. A cooker, comprising:
end walls and side walls partially defining cavity;
a tray for holding a burning fuel to generate cooking heat, supported in a lower portion of said cavity of said cooker;
a grill for supporting food, supported at an opening formed in an upper portion of said cavity of said cooker above said tray; and
a closed deflector positioned within said cavity and interposed between said tray and said grill, said deflector having a top and two sides fixedly attached between and to said end walls to form a closed space beneath said opening with each side positioned facing a corresponding side wall of said housing and sized to extend above said top by a predetermined distance to form two opposed flanges, wherein
each of the top and two sides of said closed deflector is double-walled, and
each side of said closed deflector and the corresponding facing side wall of said housing are arcuate, spaced apart and cooperate to enable a laminar flow of hot products a combustion from said burning fuel to cook food placed on said grill.

* * * * *